US012055091B2

United States Patent
Miyoshi et al.

(10) Patent No.: US 12,055,091 B2
(45) Date of Patent: Aug. 6, 2024

(54) TURBINE HOUSING, TURBOCHARGER, AND GASOLINE ENGINE

(71) Applicant: MITSUBISHI HEAVY INDUSTRIES ENGINE & TURBOCHARGER, LTD., Sagamihara (JP)

(72) Inventors: Shunsuke Miyoshi, Sagamihara (JP); Kenji Nitta, Sagamihara (JP); Hiroshi Nakagawa, Sagamihara (JP); Sosuke Irie, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/016,618

(22) PCT Filed: Dec. 28, 2020

(86) PCT No.: PCT/JP2020/049197
§ 371 (c)(1),
(2) Date: Jan. 17, 2023

(87) PCT Pub. No.: WO2022/145002
PCT Pub. Date: Jul. 7, 2022

(65) Prior Publication Data
US 2023/0287831 A1    Sep. 14, 2023

(51) Int. Cl.
*F02B 37/18*    (2006.01)
*F01D 17/14*    (2006.01)
(Continued)

(52) U.S. Cl.
CPC ............ *F02B 37/183* (2013.01); *F04D 17/10* (2013.01); *F04D 29/4206* (2013.01);
(Continued)

(58) Field of Classification Search
CPC ........ F02B 37/183; F02B 37/18; F04D 17/10; F04D 29/4206; F01D 17/146; F01D 25/12; F01D 25/24; F05D 2220/40
See application file for complete search history.

(56) References Cited

U.S. PATENT DOCUMENTS 10,590,793 B1    3/2020  Roszko et al.
2015/0240707 A1*  8/2015  Wang ................. F02B 37/16
                                                 60/602
(Continued)

FOREIGN PATENT DOCUMENTS

JP    63-128242 U    8/1988
JP    3825955 B2 *  9/2006
(Continued)

OTHER PUBLICATIONS

English Machine Translation of JP2835955B2 translated via USPTO Fit Database (Year: 2006).*
(Continued)

*Primary Examiner* — Dominick L Plakkoottam
*Assistant Examiner* — Paul W Thiede
(74) *Attorney, Agent, or Firm* — Birch, Stewart, Kolasch & Birch, LLP

(57) ABSTRACT

A turbine housing that includes: a body part including a scroll passage wall surface, an exhaust gas discharge path wall surface, and a wastegate passage wall surface provided inside the body part, the scroll passage wall surface forming a scroll passage having a scroll shape, the wastegate passage wall surface forming a wastegate passage connecting the scroll passage and the exhaust gas discharge path to each other while bypassing the turbine wheel; and an entrance flange part provided at an upstream end of the scroll passage in the body part, the entrance flange part including an exhaust gas inlet leading to the scroll passage. The wastegate passage has an entrance-side opening edge formed at the
(Continued)

scroll passage wall surface and provided at a position where the entrance-side opening edge is visually recognizable at least partially from outside the turbine housing through the exhaust gas inlet.

8 Claims, 7 Drawing Sheets

(51) Int. Cl.
    *F01D 25/10*     (2006.01)
    *F01D 25/12*     (2006.01)
    *F04D 17/10*     (2006.01)
    *F04D 29/42*     (2006.01)
    *F01D 25/24*     (2006.01)

(52) U.S. Cl.
    CPC ............ *F01D 17/146* (2013.01); *F01D 25/12* (2013.01); *F01D 25/24* (2013.01); *F02B 37/18* (2013.01); *F05D 2220/40* (2013.01)

(56) References Cited

U.S. PATENT DOCUMENTS

2017/0058763 A1* 3/2017 Suekuni .................... F02D 9/04
2017/0234211 A1* 8/2017 Uehane .................. F01D 9/026
                                                              60/602
2020/0116079 A1* 4/2020 Sano ..................... F02B 37/183
2020/0263587 A1 8/2020 Nomura et al.
2020/0318531 A1* 10/2020 Sparrer ................. F02B 37/186

FOREIGN PATENT DOCUMENTS

| | | |
|---|---|---|
| JP | 2008-69664 A | 3/2008 |
| JP | 2015-165096 A | 9/2015 |
| JP | 5846351 B2 | 1/2016 |
| JP | 2017-145719 A | 8/2017 |
| JP | 2018-53727 A | 4/2018 |
| JP | 6487982 B1 | 3/2019 |
| WO | WO 2017/158378 A1 | 9/2017 |

OTHER PUBLICATIONS

International Preliminary Report on Patentability and Written Opinion of the International Searching Authority for International Application No. PCT/JP2020/049197, dated Jul. 13, 2023, with an English translation.

* cited by examiner

TURBINE HOUSING, TURBOCHARGER, AND GASOLINE ENGINE

TECHNICAL FIELD

The present disclosure relates to a turbine housing, a turbocharger including the turbine housing, and a gasoline engine including the turbocharger.

BACKGROUND

In some cases, an engine used in an automobile, for example, is equipped with a turbocharger for improving output or fuel cost of the engine. The turbocharger rotates a turbine wheel using the energy of a high-temperature fluid such as exhaust gas discharged from the engine, thereby rotating an impeller of a compressor mechanically coupled to the turbine wheel via a rotational shaft. The turbocharger compresses gas (air, for example) to be used for combustion at the engine using the impeller driven to rotate, and feeds the compressed gas into the engine.

Patent Document 1 discloses a turbocharger including a turbine housing in which a wastegate passage (bypass passage) is formed for causing part of exhaust gas to bypass a turbine wheel without introducing this exhaust gas into the turbine wheel, and a wastegate valve for opening and closing of the wastegate passage. Patent Document 2 discloses an exhaust gas purification catalyst provided in an exhaust system of an engine (internal combustion engine). The exhaust gas purification catalyst has the function of purifying a harmful component in exhaust gas that may be hydrocarbon (HC), carbon monoxide (CO) or nitrogen oxides (NOx), for example, or collecting particle matters (PM) in the exhaust gas.

CITATION LIST

Patent Literatures

Patent Document 1: JP5846351B
Patent Document 2: JP6487982B

SUMMARY

Technical Problem

The performance of the exhaust gas purification catalyst is affected by the temperature of the catalyst or an oxygen concentration. In response to this, in some cases, the temperature of the exhaust gas purification catalyst is increased to activate the exhaust gas purification catalyst by feeding exhaust gas to pass through the wastegate passage, namely, by feeding exhaust gas not subjected to temperature reduction resulting from energy recovery at the turbine wheel into the exhaust gas purification catalyst arranged downstream from the wastegate passage. If the exhaust gas to pass through the wastegate passage is subjected to large heat dissipation loss in the turbine housing, the risk of failing to effectively increase the temperature of the exhaust gas purification catalyst is caused. In particular, if the engine is a gasoline engine, the exhaust gas discharged from the engine is at a higher temperature to result in a larger temperature difference between the exhaust gas and the turbine housing than in a case where the engine is a diesel engine, for example, causing the risk of increasing heat dissipation loss in the turbine housing. This makes it necessary to reduce heat dissipation loss of the exhaust gas in the turbine housing to pass through the wastegate passage.

In view of the above-described circumstances, an object of at least one embodiment of the present disclosure is to provide a turbine housing, a turbocharger, and a gasoline engine allowing reduction in heat dissipation loss of exhaust gas in the turbine housing to pass through a wastegate passage and allowing the temperature of an exhaust gas purification catalyst arranged downstream from the turbine housing to be increased effectively.

Solution to Problem

A turbine housing according to one embodiment of the present disclosure is a turbine housing configured to house a turbine wheel to be driven with exhaust gas discharged from a gasoline engine, including:
  a body part including a scroll passage wall surface, an exhaust gas discharge path wall surface, and a wastegate passage wall surface provided inside the body part,
  the scroll passage wall surface forming a scroll passage having a scroll shape for guiding the exhaust gas to the turbine wheel,
  the exhaust gas discharge path wall surface forming an exhaust gas discharge path for discharging the exhaust gas having passed through the turbine wheel,
  the wastegate passage wall surface forming a wastegate passage connecting the scroll passage and the exhaust gas discharge path to each other while bypassing the turbine wheel; and
  an entrance flange part provided at an upstream end of the scroll passage in the body part, the entrance flange part including an exhaust gas inlet leading to the scroll passage, wherein
  the wastegate passage has an entrance-side opening edge formed at the scroll passage wall surface and provided at a position where the entrance-side opening edge is visually recognizable at least partially from outside the turbine housing through the exhaust gas inlet.

A turbocharger according to one embodiment of the present disclosure includes the turbine housing described above.

A gasoline engine according to one embodiment of the present disclosure includes:
  a cylinder block including a plurality of cylinders;
  an exhaust manifold where exhaust gases discharged from respective ones of the plurality of cylinders join together, the exhaust manifold being provided at least partially inside the cylinder block; and
  the turbocharger described above, wherein
  the entrance flange part of the turbine housing is connected to the exhaust manifold.

Advantageous Effects

According to at least one embodiment of the present disclosure, a turbine housing, a turbocharger, and a gasoline engine are provided that allow reduction in heat dissipation loss of exhaust gas in the turbine housing to pass through a wastegate passage and allow the temperature of an exhaust gas purification catalyst arranged downstream from the turbine housing to be increased effectively.

DETAILED DESCRIPTION

Figure 1:
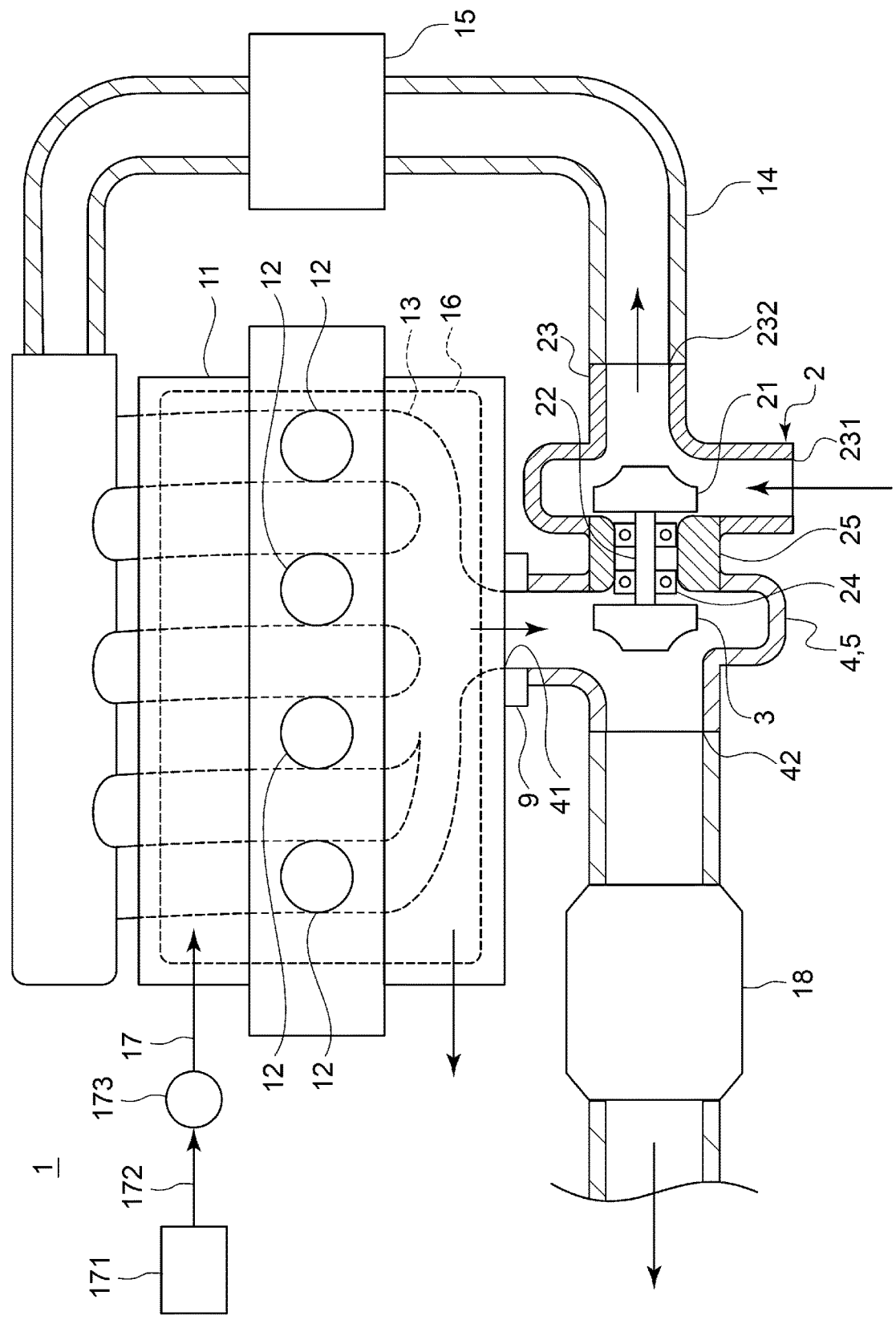
FIG. 1 is a schematic configuration view schematically showing the configuration of an engine including a turbocharger according to one embodiment of the present disclosure.

Some embodiments of the present disclosure will now be described in detail with reference to the accompanying drawings. It is intended, however, that dimensions, materials, shapes, relative positions and the like of components described in the embodiments or illustrated in the drawings shall be interpreted as illustrative only and not limitative of the scope of the present disclosure.

For example, an expression indicating a relative or absolute location such as "in one direction," "along one direction," "parallel," "perpendicular," "center," "concentric," or "coaxial" is used not only to indicate such a location strictly but also to indicate a state in which relative displacement occurs with a tolerance or at an angle or a distance of such a degree as to fulfill the same function.

For example, expressions indicating equality between things such as "same," "equal," and "uniform" are used not only to indicate a strictly equal state but also to indicate a state in the presence of a tolerance or a difference of such a degree as to fulfill the same function.

For example, an expression indicating a shape such as a rectangular shape or a circular cylindrical shape is used not only to indicate a shape such as a rectangular shape or a circular cylindrical shape in a geometrically strict sense but also to indicate a shape with unevenness or a chamfer formed within a range in which the same effect is fulfilled.

On the other hand, an expression "comprising," "including," or "having" one constituting element is not an exclusive expression of eliminating the presence of other constituting elements.

A comparable structure will be given the same sign and, in some cases, description thereof will be omitted.

(Engine)

FIG. 1 is a schematic configuration view schematically showing the configuration of an engine including a turbocharger according to one embodiment of the present disclosure.

As shown in FIG. 1, a turbocharger 2 according to some embodiments is mounted on a gasoline engine 1. As shown in FIG. 1, the gasoline engine 1 at least includes a cylinder block 11 including a plurality of cylinders 12, an exhaust manifold 13 where exhaust gases discharged from respective ones of the plurality of cylinders 12 join together, and the turbocharger 2.

According to the illustrated embodiment, the gasoline engine 1 further includes a compressed gas supply line 14 for guiding compressed gas compressed by the turbocharger 2 to each of the plurality of cylinders 12, a cooler 15 provided in the compressed gas supply line 14, a water jacket 16 provided inside the cylinder block 11, and a coolant supply line 17 for supplying a coolant to the water jacket 16 from outside the cylinder block 11. The cooler 15 is configured to cool the compressed gas flowing through the compressed gas supply line 14. The water jacket 16 includes a passage provided in such a manner as to surround each of the plurality of cylinders 12 and allowing the coolant to pass through. The coolant supply line 17 is configured to supply the coolant to the water jacket 16. The compressed gas includes compressed air. The coolant includes a cooling water.

According to the embodiment shown in FIG. 1, the coolant supply line 17 includes a cooling water storage tank 171 configured to store the cooling water, a cooling water supply pipe 172 for feeding the cooling water stored in the cooling water storage tank 171 to the water jacket 16, and a cooling water pump 173 provided in the cooling water supply pipe 172. The cooling water supply pipe 172 is connected on one side to the cooling water storage tank 171 and is connected on the other side to the water jacket 16. The cooling water pump 173 is configured to feed the cooling water to the other side of the cooling water supply pipe 172. By driving the cooling water pump 173, the cooling water stored in the cooling water storage tank 171 is fed to the cooling water supply pipe 172, is caused to flow toward the other side through the cooling water supply pipe 172, and is then supplied to the water jacket 16. The cooling water (coolant) in the water jacket 16 is used for cooling the plurality of cylinders 12, the cylinder block 11, and others.

(Turbocharger)

As shown in FIG. 1, the turbocharger 2 includes a turbine wheel 3, a compressor wheel 21, a rotational shaft 22 connected to each of the turbine wheel 3 and the compressor wheel 21, a turbine housing 4 configured to house the turbine wheel 3 rotatably, and a compressor housing 23 configured to house the compressor wheel 21 rotatably. According to the illustrated embodiment, the turbocharger 2 further includes a bearing 24 supporting the rotational shaft 22 rotatably, and a bearing housing 25 configured to house the bearing 24.

According to the illustrated embodiment, the rotational shaft 22 is coupled on one side of the lengthwise direction thereof to the turbine wheel 3 and is coupled on the other side of the lengthwise direction to the compressor wheel 21. The rotational shaft 22 is rotatably supported by the bearing 24 between the turbine wheel 3 and the compressor wheel 21 in the lengthwise direction of the rotational shaft 22. The turbine wheel 3 and the compressor wheel 21 are rotatable integrally with each other through the rotational shaft 22. The bearing housing 25 is arranged between the turbine housing 4 and the compressor housing 23 and is mechanically coupled to each of the turbine housing 4 and the compressor housing 23 with a fastening member not shown in the drawings such as a bolt or a V clamp, for example.

As shown in FIG. 1, the turbine housing 4 includes an exhaust gas inlet 41 for introducing exhaust gas into the turbine housing 4, and an exhaust gas outlet 42 for discharging the exhaust gas to the outside. The compressor housing 23 includes a gas inlet 231 for introducing gas into the compressor housing 23, and a gas outlet 232 for discharging the gas having passed through the compressor wheel 21 to the outside. The compressed gas supply line 14 is connected on one side to the gas outlet 232 and is connected on the other side to the plurality of cylinders 12.

Exhaust gas discharged from the exhaust manifold 13 is introduced into the turbine housing 4 through the exhaust gas inlet 41 at the turbocharger 2. At least part of the exhaust gas introduced into the turbine housing 4 is guided to the turbine wheel 3. The turbocharger 2 rotates the turbine wheel 3 using the energy of the exhaust gas guided to the turbine wheel 3. As the compressor wheel 21 is coupled to the turbine wheel 3 through the rotational shaft 22, the compressor wheel 21 rotates in conjunction with the rotation of the turbine wheel 3. The turbocharger 2 is configured to compress gas introduced into the compressor housing 23 through the gas inlet 231 in response to the rotation of the compressor wheel 21, and to feed the compressed gas to each of the plurality of cylinders 12 through the gas outlet 232 and the compressed gas supply line 14. The compressed gas fed to each of the plurality of cylinders 12 burns together with fuel to generate exhaust gas. The exhaust gas having passed through the turbine wheel 3 is discharged through the exhaust gas outlet 42 to the outside of the turbine housing 4.

(Exhaust Gas Purification Catalyst)

According to the illustrated embodiment, the gasoline engine 1 further includes an exhaust gas purification catalyst 18 provided downstream from the turbine housing 4. Exhaust gas discharged to the outside of the turbine housing 4 through the exhaust gas outlet 42 is fed to the exhaust gas purification catalyst 18. The exhaust gas purification catalyst 18 has the function of purifying a harmful component in the exhaust gas that may be hydrocarbon (HC), carbon monoxide (CO) or nitrogen oxides (NOx), for example, or collecting particle matters (PM) in the exhaust gas. The exhaust gas purification catalyst 18 may be any one of conventionally and publicly known catalysts including a three way catalyst, an oxygen catalyst (DOC), and an NOx-adsorbed reduction catalyst, for example. The exhaust gas purification catalyst 18 may contain a carrier and a precious metal supported on the carrier. The precious metal mentioned herein supported on the carrier may include at least one of rhodium (Rh), palladium (Pd), and a platinum (Pt). The exhaust gas purification catalyst 18 is configured to activate exhaust gas purifying reaction by being increased in temperature with the heat of the exhaust gas, for example.

(Turbine Housing)

Figure 2:
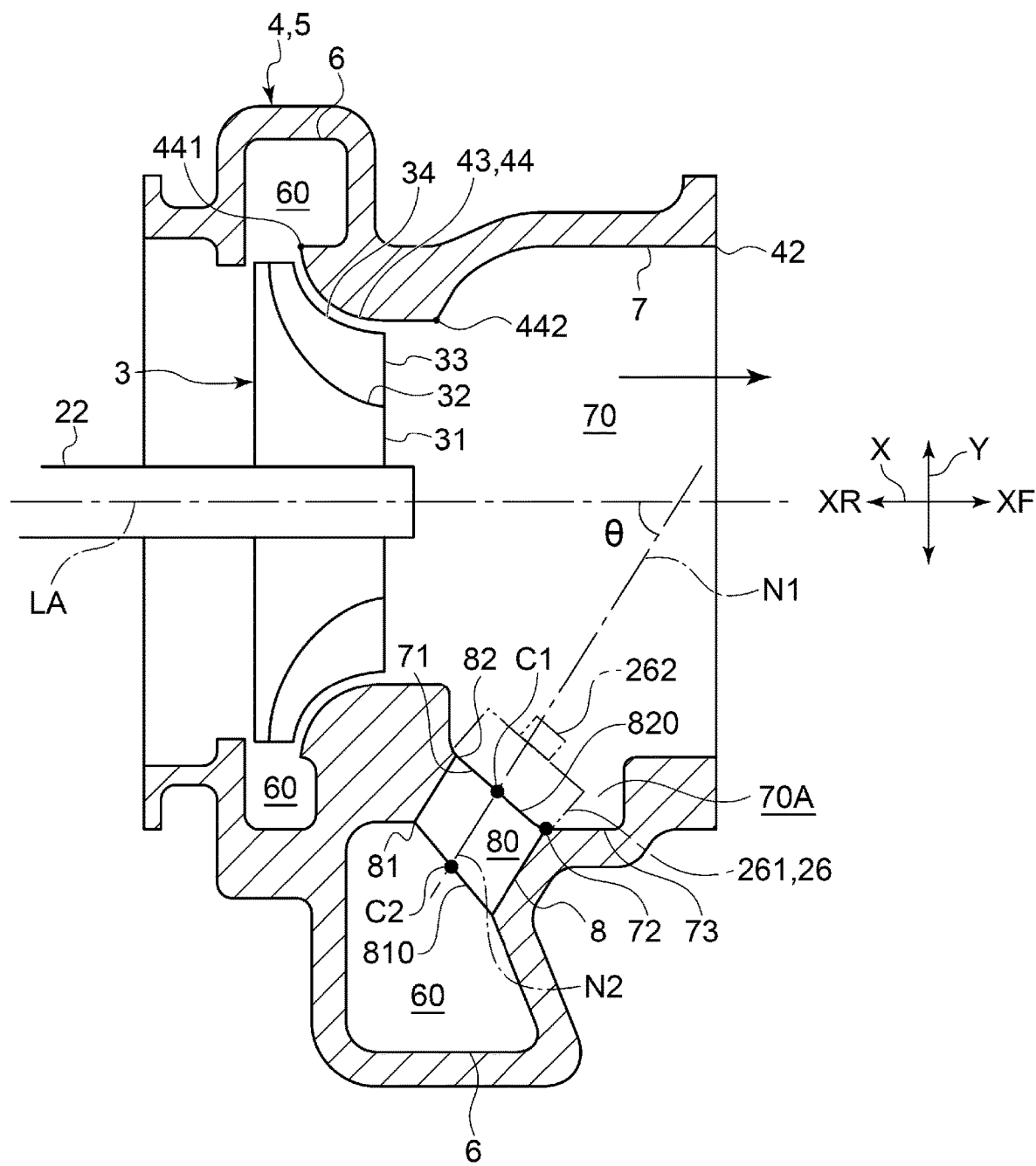
FIG. 2 is a schematic sectional view taken along an axis of a turbine housing according to one embodiment of the present disclosure.

FIG. 2 is a schematic sectional view taken along an axis of the turbine housing according to one embodiment of the present disclosure. As shown in FIG. 2, the turbine housing 4 includes a body part 5. The body part 5 includes a scroll passage wall surface 6, an exhaust gas discharge path wall surface 7, and a wastegate passage wall surface 8 provided inside the body part 5. The scroll passage wall surface 6 forms a scroll passage 60 having a scroll shape for guiding exhaust gas to the turbine wheel 3. The exhaust gas discharge path wall surface 7 forms an exhaust gas discharge path 70 for discharging the exhaust gas having passed through the turbine wheel 3. The wastegate passage wall surface 8 forms a wastegate passage 80 connecting the scroll passage 60 and the exhaust gas discharge path 70 to each other while bypassing the turbine wheel 3. In the following, an upstream side of a flow direction of the exhaust gas may simply be called an upstream side, and a downstream side of the flow direction of the exhaust gas may simply be called a downstream side. The exhaust gas inlet 41 leads to the scroll passage 60. The exhaust gas outlet 42 leads to the exhaust gas discharge path 70.

The turbine housing 4 houses the turbine wheel 3 on an inner peripheral side of the scroll passage 60. In the following, a direction in which an axis LA of the turbine wheel 3 extends is defined as an axis direction X, and a direction perpendicular to the axis LA is defined as a radial direction Y. A side (on the right side in FIG. 2) of the axis direction X on which the exhaust gas outlet 42 is located relative to the turbine wheel 3 is defined as a turbine side XF. A side (on the left side in FIG. 2) of the axis direction X on the opposite side of the turbine side XF, namely, a side on which the turbine wheel 3 is located relative to the exhaust gas outlet 42 is defined as a compressor side XR.

(Turbine Wheel)

As shown in FIG. 2, the turbine wheel 3 includes a hub 31 and a plurality of turbine blades 33 provided on an outer surface 32 of the hub 31. As the hub 31 is coupled to the rotational shaft 22 on the one side of the lengthwise direction, the hub 31 and the plurality of turbine blades 33 are rotatable integrally with the rotational shaft 22 about the axis LA of the turbine wheel 3. The outer surface 32 of the hub 31 is formed into a concave curved shape at a distance from the axis LA that increases as the outer surface 32 extends from the turbine side XF toward the compressor side XR. Each of the plurality of turbine blades 33 is arranged in such a manner that the turbine blades 33 are spaced from each other in a circumferential direction about the axis LA.

The turbine housing 4 has a shroud surface 44 formed inside the turbine housing 4 that includes a convex curved surface 43 formed into a convex curved shape at a distance from the axis LA that increases as the convex curved surface 43 extends from the turbine side XF toward the compressor side XR. The convex curved surface 43 forms a gap between the convex curved surface 43 and a tip 34 of each of the plurality of turbine blades 33. The shroud surface 44 is formed between the scroll passage wall surface 6 and the exhaust gas discharge path wall surface 7. The shroud surface 44 has a downstream end 441 continuous with the scroll passage wall surface 6. The shroud surface 44 has an upstream end 442 continuous with the exhaust gas discharge path wall surface 7.

The turbine wheel 3 is arranged between the scroll passage 60 and the exhaust gas discharge path 70, and is configured to guide exhaust gas introduced from the outside of the radial direction Y through the scroll passage 60 toward the turbine side XF of the axis direction X. The exhaust gas discharge path 70 is configured to guide the exhaust gas having passed through the turbine wheel 3 from the compressor side XR toward the turbine side XF of the axis direction X. The exhaust gas having passed through the turbine wheel 3 flows in the exhaust gas discharge path 70 toward the turbine side XF and is then discharged to the outside of the turbine housing 4 through the exhaust gas outlet 42.

The turbine housing 4 has an entrance-side opening edge 81 of the wastegate passage 80 formed at the scroll passage wall surface 6, and an exit-side opening edge 82 of the wastegate passage 80 formed at the exhaust gas discharge path wall surface 7. The wastegate passage wall surface 8 is continuous with the scroll passage wall surface 6 via the entrance-side opening edge 81 and is continuous with the exhaust gas discharge path wall surface 7 via the exit-side opening edge 82. The wastegate passage 80 has an entrance opening 810 formed internal to the entrance-side opening edge 81, and an exit opening 820 formed internal to the exit-side opening edge 82. The wastegate passage 80 leads to the scroll passage 60 at the entrance opening 810 and leads to the exhaust gas discharge path 70 at the exit opening 820.

The turbocharger 2 further includes a wastegate valve 26 configured to allow opening and closing of the exit opening 820 of the wastegate passage 80. The wastegate valve 26 includes a valve body 261 closing the exit opening 820, and a valve body driver 262 configured to support the valve body 261 and allow driving of the valve body 261. The wastegate valve 26 drives the valve body 261 using the valve body driver 262 to close or open the exit opening 820, thereby controlling the flow rate of exhaust gas to flow from the wastegate passage 80 into the exhaust gas discharge path 70. Opening the exit opening 820 with the wastegate valve 26 and diverting exhaust gas to flow in the scroll passage 60 toward the turbine wheel 3 partially into the wastegate passage 80 makes it possible to reduce the amount or thermal energy of the exhaust gas to be fed to the turbine wheel 3. This eventually makes it possible to reduce the boost pressure of compressed gas to be fed to each of the plurality of cylinders 12.

FIG. 2 schematically shows a plane covering the axis LA of the turbine wheel 3 and a center C1 of the exit opening 820. As shown in FIG. 2, according to the illustrated embodiment, the exhaust gas discharge path wall surface 7 includes a tilting surface 71 and a valve housing surface 73 formed at at least part of the exhaust gas discharge path wall surface 7 in a peripheral direction. The tilting surface 71 tilts in such a manner that a distance from the axis LA increases as the tilting surface 71 extends toward the turbine side XF. The valve housing surface 73 extends toward the turbine side XF in the axis direction X from a downstream end 72 of the tilting surface 71. The exhaust gas discharge path 70 includes valve housing space 70A in which the valve body 261 of the wastegate valve 26 is housed. The valve housing space 70A is defined by the tilting surface 71 and the valve housing surface 73. The exit-side opening edge 82 is formed at at least one of the tilting surface 71 and the valve housing surface 73. The exit opening 820 leads to the valve housing space 70A.

Figure 3:
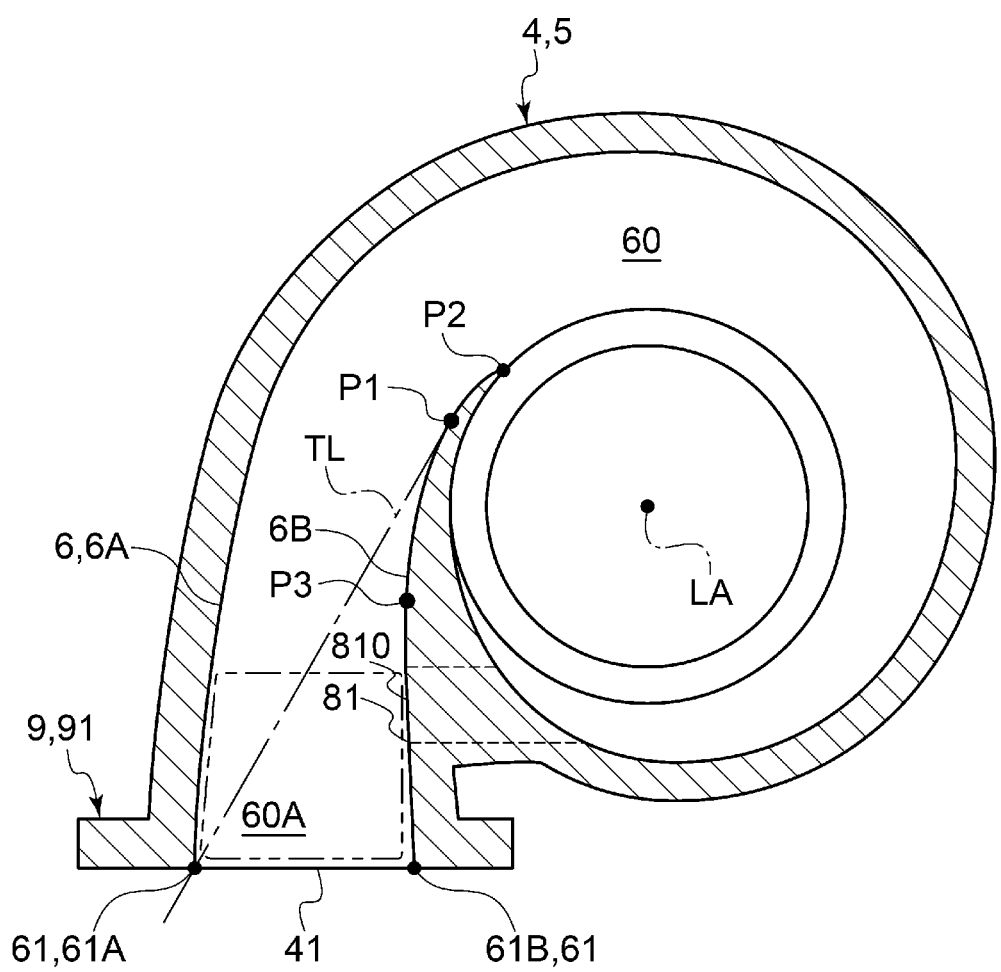
FIG. 3 is an explanatory view for explaining the turbine housing according to one embodiment of the present disclosure.

FIG. 3 is an explanatory view for explaining the turbine housing according to one embodiment of the present disclosure. FIG. 3 schematically shows the turbine housing 4 in a plan view visually recognized from the exit side (turbine side XF) of the exhaust gas discharge path 70 along the axis LA. As shown in FIG. 3, the turbine housing 4 includes the body part 5 and an entrance flange part 9.

As shown in FIG. 3, the entrance flange part 9 is provided at an upstream end 61 of the scroll passage 60 in the body part 5 and includes a rim 91 projecting toward an outer peripheral side. The entrance flange part 9 is provided with the exhaust gas inlet 41 leading to the scroll passage 60. According to the embodiment shown in FIG. 1, the entrance flange part 9 is connected to the exhaust manifold 13. This causes exhaust gas to flow from the exhaust manifold 13 into the scroll passage 60 through the exhaust gas inlet 41. According to the illustrated embodiment, the shape of the turbine housing 4 is formed by casting.

As shown in FIG. 3, the turbine housing 4 according to some embodiments includes the body part 5 including the scroll passage wall surface 6, the exhaust gas discharge path wall surface 7, and the wastegate passage wall surface 8 provided inside the body part 5, and the entrance flange part 9 including the exhaust gas inlet 41 leading to the scroll passage 60. The entrance-side opening edge 81 of the wastegate passage 80 formed at the scroll passage wall surface 6 is provided at a position where the entrance-side opening edge 81 is visually recognizable at least partially from outside the turbine housing 4 through the exhaust gas inlet 41.

According to the illustrated embodiment, in a plan view such as that shown in FIG. 3, the scroll passage wall surface 6 includes a scroll outer wall surface 6A forming an outer peripheral side of the scroll passage 60, and a scroll inner wall surface 6B formed on an inner peripheral side relative to the scroll outer wall surface 6A and forming the scroll passage 60 between the scroll outer wall surface 6A and the scroll inner wall surface 6B. The scroll inner wall surface 6B forms an inner peripheral side of the scroll passage 60. In a plan view such as that shown in FIG. 3, a tangent TL passing through an upstream end 61A of the scroll outer wall surface 6A (an outer peripheral end of the exhaust gas inlet 41) and making contact with the scroll inner wall surface 6B and the scroll inner wall surface 6B contact each other at a contact point defined as P1. The entrance-side opening edge 81 is provided upstream from the contact point P1 on the scroll inner wall surface 6B. In this case, the entrance-side opening edge 81 is provided at a position where the entrance-side opening edge 81 is visually recognizable at least partially from outside the turbine housing 4 through the exhaust gas inlet 41. Even if the entrance-side opening edge 81 is not visually recognizable from outside the turbine housing 4 through the exhaust gas inlet 41, as long as a place (around a tongue portion P2) on the scroll inner wall surface 6B downstream from the entrance-side opening edge 81 is visually recognizable from outside the turbine housing 4 through the exhaust gas inlet 41, the entrance-side opening edge 81 is regarded as being provided at a position where the entrance-side opening edge 81 is visually recognizable from outside the turbine housing 4 through the exhaust gas inlet 41.

According to the illustrated embodiment, in a plan view such as that shown in FIG. 3, at least a part of the entrance-side opening edge 81 is located upstream from a center position P3 (closer to an upstream end 61B than the center position P3) along the length of a curve connecting the upstream end 61B at the scroll inner wall surface 6B (an inner peripheral end of the exhaust gas inlet 41) and the tongue portion P2 to each other.

In the above-described configuration, in the turbine housing 4, the entrance-side opening edge 81 of the wastegate passage 80 is provided at a position where the entrance-side opening edge 81 is visually recognizable at least partially from outside the turbine housing 4 through the exhaust gas inlet 41. In this case, the scroll passage 60 (upstream-side scroll passage 60A) defined between the entrance opening 810 of the wastegate passage 80 and the exhaust gas inlet 41 of the entrance flange part 9 has a short length. Forming the upstream-side scroll passage 60A into a short length achieves reduction in heat dissipation loss of exhaust gas in the upstream-side scroll passage 60A to pass through the wastegate passage 80, namely, exhaust gas to flow from the exhaust gas inlet 41 into the wastegate passage 80 through the upstream-side scroll passage 60A. This makes it possible to suppress temperature drop of the exhaust gas to pass through the wastegate passage 80 and flow downstream from the turbine housing 4. As a result, the temperature of the exhaust gas purification catalyst 18 arranged downstream from the turbine housing 4 can be increased effectively.

If the turbine housing 4 is mounted on the gasoline engine 1, exhaust gas discharged from the gasoline engine 1 is at a higher temperature to result in a larger temperature difference between the exhaust gas and the turbine housing 4 than in a case where the turbine housing 4 is mounted on a different type of internal combustion engine such as a diesel engine, for example, causing the risk of increasing heat dissipation loss in the turbine housing 4. Even if the turbine housing 4 is mounted on the gasoline engine 1, the above-described configuration makes it possible to effectively reduce heat dissipation loss of the exhaust gas in the turbine housing 4 to pass through the wastegate passage 80.

Some embodiments described below are applicable also to a case where the entrance-side opening edge 81 is not provided at a position where the entrance-side opening edge 81 is visually recognizable from outside the turbine housing 4 through the exhaust gas inlet 41.

According to some embodiments, in a plane covering the axis LA of the turbine wheel 3 and the center C1 of the exit opening 820 such as that shown in FIG. 2, the exhaust gas discharge path 70 is configured to guide exhaust gas from one side (compressor side XR) toward the other side (turbine side XF) of a direction in which the axis LA of the turbine wheel 3 extends (axis direction X). A normal N1 passing through the center C1 of the exit opening 820 of the wastegate passage 80 (a line passing through the center C1 and vertical to the exit opening 820) is configured to extend in a direction intersecting the axis LA of the turbine wheel 3.

According to the illustrated embodiment, the scroll passage 60 is formed into a spiral shape extending toward the compressor side XR of the axis direction X as the scroll passage 60 extends downstream (toward the turbine wheel 3). Thus, an upstream portion of the scroll passage 60 is provided on an outer peripheral side of the exhaust gas discharge path 70. The wastegate passage 80 extends in the radial direction and tilts in such a manner as to locate the center C1 of the exit opening 820 of the wastegate passage 80 closer to the turbine side XF than a center C2 of the entrance opening 810 of the wastegate passage 80. The entrance opening 810 and the exit opening 820 are both opened toward a direction conforming to a direction in which the normal N1 extends.

In the above-described configuration, the wastegate passage 80 has the exit opening 820 leading to the exhaust gas discharge path 70 and has the entrance opening 810 leading to the scroll passage 60 provided on an outer peripheral side of the exhaust gas discharge path 70. The wastegate passage 80 is configured in such a manner that the normal N1 passing through the center C1 of the exit opening 820 extends in a direction intersecting the axis LA of the turbine wheel 3. In this case, the length of the wastegate passage 80 (a distance from the entrance opening 810 to the exit opening 820) can be shortened, compared to a case where the normal N1 extends in a direction in which the axis LA of the turbine wheel 3 extends. Shortening the length of the wastegate passage 80 makes it possible to reduce heat dissipation loss of exhaust gas in the wastegate passage 80 to pass in the wastegate passage 80. By doing so, it becomes possible to suppress temperature drop of the exhaust gas to pass through the wastegate passage 80 and flow downstream from the turbine housing 4. As a result, the temperature of the exhaust gas purification catalyst 18 arranged downstream from the turbine housing 4 can be increased effectively.

According to some embodiments, in a plane covering the axis LA of the turbine wheel 3 and the center C1 of the exit opening 820 such as that shown in FIG. 2, $30° \leq \theta \leq 60°$ is satisfied where $\theta$ is an angle formed between the axis LA and the normal N1.

In the above-described configuration, the length of the wastegate passage 80 can be shortened if the angle $\theta$ satisfies $30° \leq \theta \leq 60°$. If the angle $\theta$ satisfies $30° \leq \theta \leq 60°$, exhaust gas having flowed into the exhaust gas discharge path 70 from the exit opening 820 of the wastegate passage 80 can be guided to the exhaust gas outlet 42 along the exhaust gas discharge path wall surface 7 and can be discharged to the outside of the turbine housing 4 from the exhaust gas outlet 42. This allows the exhaust gas having passed through the wastegate passage 80 to flow favorably in the exhaust gas discharge path 70, so that heat dissipation loss of the exhaust gas to pass through the wastegate passage 80 can be reduced in the exhaust gas discharge path 70. This makes it possible to suppress temperature drop of the exhaust gas to pass through the wastegate passage 80 and flow downstream from the turbine housing 4. As a result, the temperature of the exhaust gas purification catalyst 18 arranged downstream from the turbine housing 4 can be increased effectively.

As shown in FIG. 1, the turbocharger 2 according to some embodiments includes the turbine housing 4. In this case, as the length of the upstream-side scroll passage 60A in the turbine housing 4 is short in the turbocharger 2, heat dissipation loss of exhaust gas to pass through the wastegate passage 80 can be reduced in the upstream-side scroll passage 60A. This eventually makes it possible to effectively increase the temperature of the exhaust gas purification catalyst 18 arranged downstream from the turbine housing 4.

As shown in FIG. 1, the gasoline engine 1 according to some embodiments includes the turbocharger 2, the cylinder block 11 with the plurality of cylinders 12, and the exhaust manifold 13 where exhaust gases discharged from respective ones of the plurality of cylinders 12 join together. The exhaust manifold 13 is provided at least partially inside the cylinder block 11. The entrance flange part 9 of the turbine housing 4 is connected to the exhaust manifold 13.

In the above-described configuration, the exhaust gases discharged from respective ones of the plurality of cylinders 12 pass through the exhaust manifold 13 and then flow into the scroll passage 60 from the exhaust gas inlet 41 of the entrance flange part 9. The exhaust manifold 13 is provided at least partially inside the cylinder block 11 with the plurality of cylinders 12, and the entrance flange part 9 is connected to the exhaust manifold 13. In this case, heat dissipation loss of the exhaust gases discharged from respective ones of the plurality of cylinders 12 can be reduced in the exhaust manifold 13. Temperature drop of exhaust gas to pass through the wastegate passage 80 and flow downstream from the turbine housing 4 is suppressed on an upstream side, making it possible to effectively increase the temperature of the exhaust gas purification catalyst 18 arranged downstream from the turbine housing 4.

Figure 4:
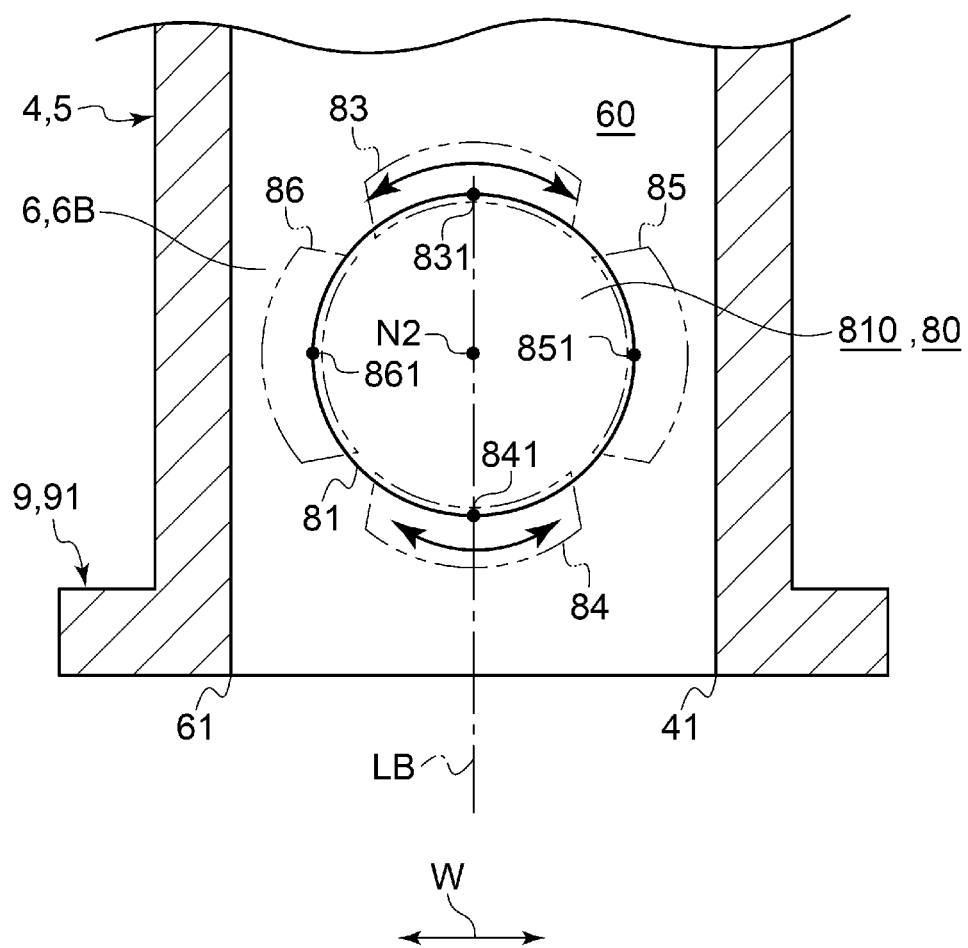
FIG. 4 is an explanatory view for explaining an entrance-side opening edge of a wastegate passage in the turbine housing according to one embodiment of the present disclosure.

FIG. 4 is an explanatory view for explaining the entrance-side opening edge of the wastegate passage in the turbine housing according to one embodiment of the present disclosure. FIG. 4 schematically shows the turbine housing 4 in a plan view where the entrance-side opening edge 81 at the scroll inner wall surface 6B (scroll passage wall surface 6) is visually recognized from the front, specifically, from the scroll passage 60 along a normal N2 passing through the center C2 of the entrance opening 810 of the wastegate passage 80 (a line passing through the center C2 and vertical to the entrance opening 810). As shown in FIG. 4, according to some embodiments, the entrance-side opening edge 81 is formed into a circular ring-like shape as viewed from the front. According to some other embodiments, the entrance-side opening edge 81 may be formed into an oval ring-like shape as viewed from the front or into a rectangular ring-like shape as viewed from the front.

In the following, in a plan view where the entrance-side opening edge 81 is visually recognized along the normal N2, a direction perpendicular to a line LC connecting an upstream end 841 and a downstream end 831 at the entrance-side opening edge 81 to each other is defined as an opening width direction W of the entrance opening 810 of the wastegate passage 80.

As shown in FIG. 4, the entrance-side opening edge 81 includes a downstream end portion 83 including the downstream end 831 at the entrance-side opening edge 81, an upstream end portion 84 including the upstream end 841 at the entrance-side opening edge 81, an end portion 85 on one side including an end 851 on one side of the opening width direction W at the entrance-side opening edge 81, and an end portion 86 on the other side including an end 861 on the other side of the opening width direction W at the entrance-side opening edge 81.

In recent years, for encouraging higher output of the gasoline engine 1, the temperature of exhaust gas to be introduced into the turbine housing 4 tends to be increased (to a temperature of equal to or higher than 1000° C., for example). Shortening the length of the scroll passage 60 (upstream-side scroll passage 60A) between the entrance opening 810 of the wastegate passage 80 and the exhaust gas inlet 41 of the entrance flange part 9 described above results in exposure of the entrance-side opening edge 81 to exhaust gas of a higher temperature than in a conventional case.

Figure 5:
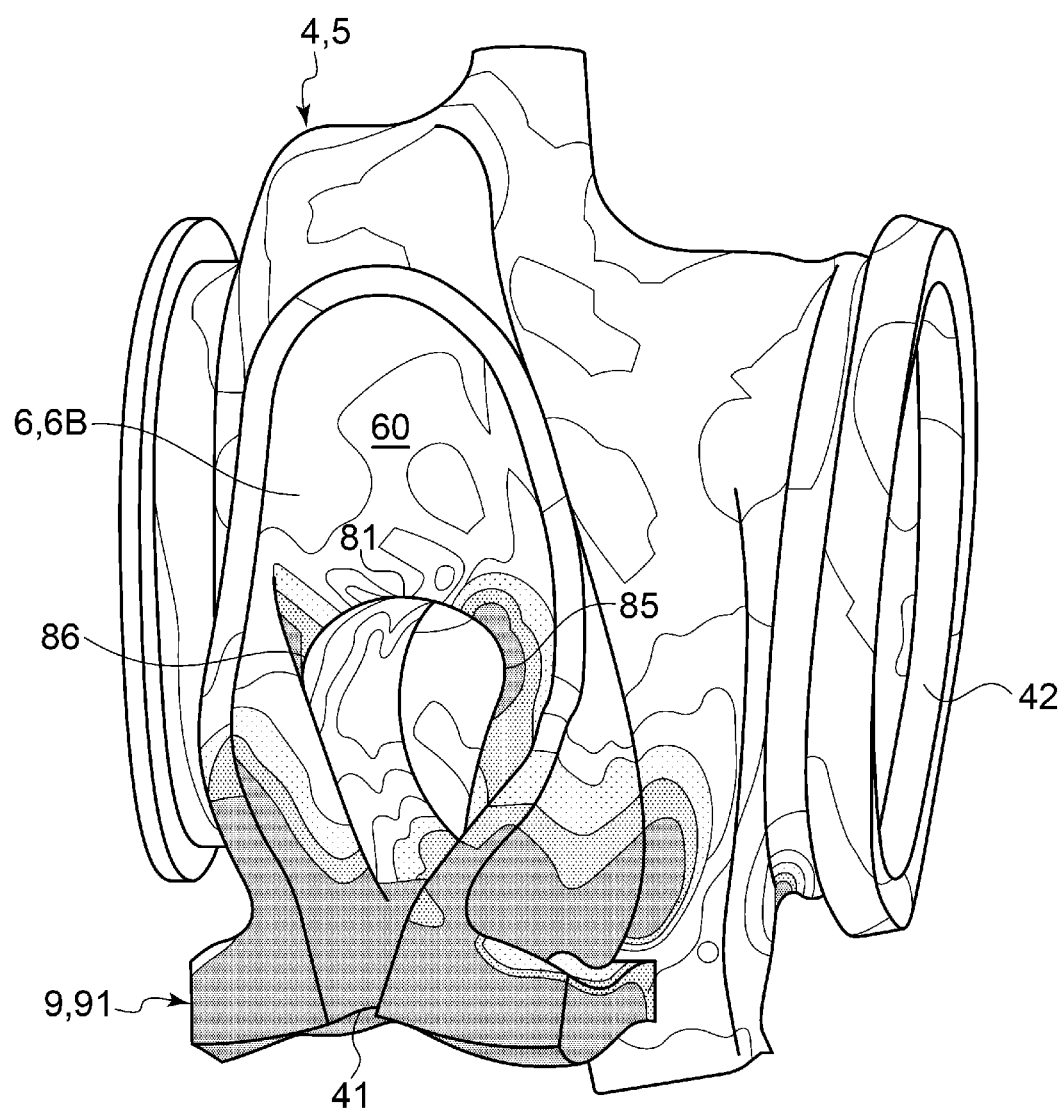
FIG. 5 is an explanatory view for explaining thermal elongation of the turbine housing according to one embodiment of the present disclosure.

FIG. 5 is an explanatory view for explaining thermal elongation of the turbine housing according to one embodiment of the present disclosure. FIG. 5 shows result of analysis on thermal strain of the turbine housing 4. A place of larger strain is shown by darker indication.

As shown in FIG. 4, with the heat of exhaust gas flowing in the scroll passage 60, the entrance-side opening edge 81 is subjected to thermal elongation occurring in such a manner that the elongation develops in the opening width direction W (right-left direction in FIG. 4) at an end portion (downstream end portion 83) on a downstream side of the entrance-side opening edge 81 (on a side farther from the exhaust gas inlet 41 in a direction in which an axis LB of the exhaust gas inlet 41 extends, which corresponds to an upper side in FIG. 4). As the entrance flange part 9 is connected to the exhaust manifold 13, the entrance flange part 9 is cooled with cooling water (coolant) in the water jacket 16. For this reason, the thermal elongation developing in the opening width direction W is suppressed at an end portion (upstream end portion 84) on an upstream side of the entrance-side opening edge 81 (on a side closer to the exhaust gas inlet 41 in the direction in which the axis LB extends, which corresponds to a lower side in FIG. 4), compared to that occurring at the downstream end portion 83. As a result of the difference in thermal elongation between the upstream end portion 84 and the downstream end portion 83 of the entrance-side opening edge 81, large thermal strain occurs in the vicinities of opposite end portions of the opening width direction W, namely, in the vicinity of the one-side end portion 85 and in the vicinity of the other-side end portion 86 to cause the probability of the occurrence of a crack, as shown in FIG. 5. It is necessary to prevent leakage of exhaust gas to the outside of the turbine housing 4 to be caused by development of such a crack and penetration thereof through the turbine housing 4.

Figure 6:
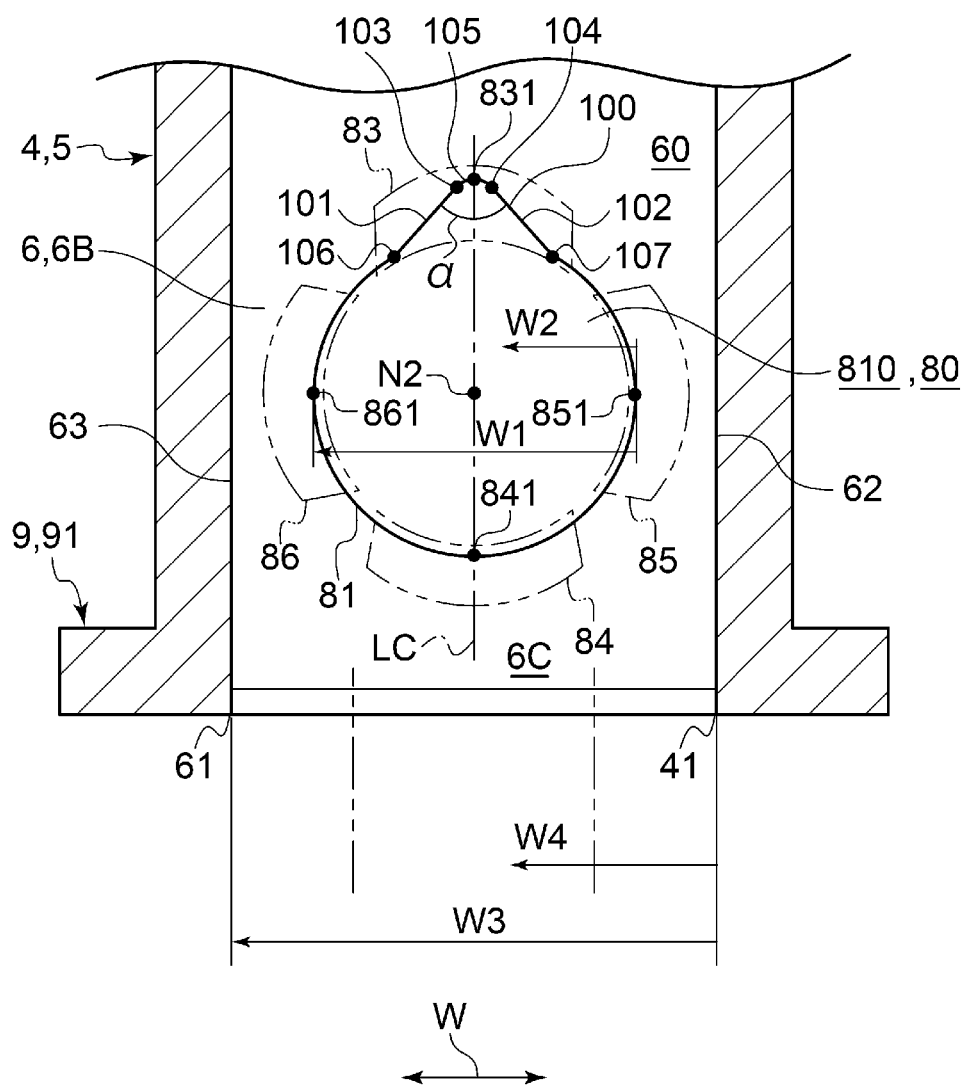
FIG. 6 is an explanatory view for explaining the entrance-side opening edge of the wastegate passage in the turbine housing according to one embodiment of the present disclosure.
Figure 7:
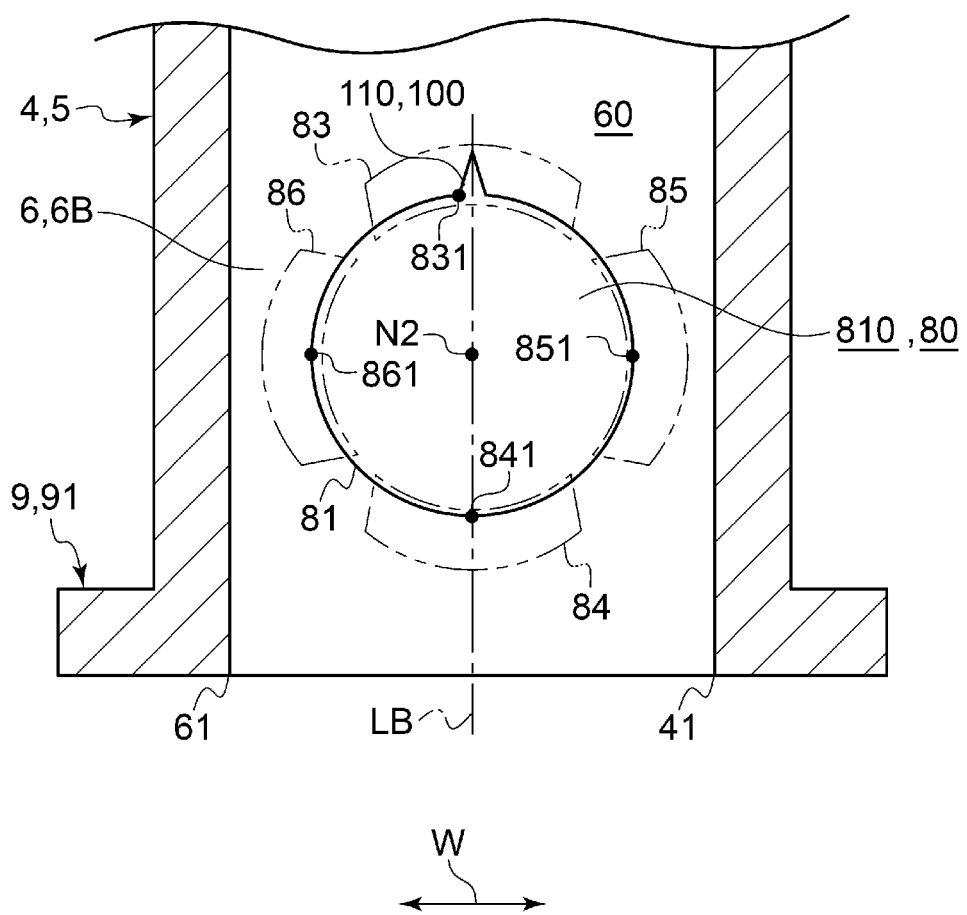
FIG. 7 an explanatory view for explaining the entrance-side opening edge of the wastegate passage in the turbine housing according to one embodiment of the present disclosure.

Each of FIGS. 6 and 7 is an explanatory view for explaining the entrance-side opening edge of the wastegate passage in the turbine housing according to one embodiment of the present disclosure. Each of FIGS. 6 and 7 schematically shows the state of the entrance-side opening edge 81 at the scroll inner wall surface 6B (scroll passage wall surface 6) viewed from the front, namely, from the scroll passage 60.

As shown in FIGS. 6 and 7, according to some embodiments, the entrance-side opening edge 81 in the turbine housing 4 includes a stress concentration part 100 provided at the downstream end portion 83 including the downstream end 831 at the entrance-side opening edge 81. The stress concentration part 100 is configured to cause concentration of stress resulting from thermal elongation when the entrance-side opening edge 81 is exposed to the heat of exhaust gas.

The downstream end portion 83 is composed of a region including the downstream end 831 provided downstream from each of the one end 851 and the other end 861 of the entrance-side opening edge 81. According to the illustrated embodiment, the downstream end portion 83 (stress concentration part 100) is provided in a central area in the opening width direction W at the entrance-side opening edge 81. In other words, in a plan view where the entrance-side opening edge 81 is visually recognized along the normal N2 such as that shown in FIG. 6, while a distance from the one end 851 to the other end 861 in the opening width direction W is defined as W1 along which the entrance-side opening edge 81 has a maximum length in the opening width direction W, the downstream end portion 83 (stress concentration part 100) is provided within a range in which the downstream end portion 83 is at a distance W2 from the one end 851 in the opening width direction W (a direction toward the other end 861 is defined as a positive direction) that satisfies a condition that $0.25W1 \leq W2 \leq 0.75W1$.

In the above-described configuration, the entrance-side opening edge 81 includes the stress concentration part 100 provided at the downstream end portion 83 of the entrance-side opening edge 81 and configured to cause concentration of stress resulting from thermal elongation. The stress concentration part 100 is to cause concentration of stress resulting from thermal elongation with the heat of exhaust gas flowing in the turbine housing 4 at an initial stage to cause a crack. Providing the stress concentration part 100 at the downstream end portion 83 of the entrance-side opening edge 81 makes it possible to reduce the occurrence of concentration of stress resulting from thermal elongation and the occurrence of a crack in a part (for example, in the vicinity of the one-side end portion 85 or in the vicinity of the other-side end portion 86) of the entrance-side opening edge 81 other than the downstream end portion 83. The downstream end portion 83 of the entrance-side opening edge 81 has a larger thickness to an outer surface 45 of the turbine housing 4 than portions except the downstream end portion 83, making it possible to prevent leakage of exhaust gas to the outside of the turbine housing 4 to be caused by development of the above-described crack and penetration thereof through the turbine housing 4.

As shown in FIG. 6, according to some embodiments, the stress concentration part 100 (downstream end portion 83) is provided in a central area 6C in the opening width direction W of the entrance opening 810 of the wastegate passage 80 at the scroll passage wall surface 6. Specifically, in a plan view where the entrance-side opening edge 81 is visually recognized along the normal N2 such as that shown in FIG. 6, while a distance in the opening width direction W from an end 62 on one side to an end 63 on the other side of the scroll passage wall surface 6 in the opening width direction W is defined as W3, the stress concentration part 100 (downstream end portion 83) is provided within a range (corresponding to the central area 6C between two lines of alternate long and two short dashes in the opening width direction W) in which the stress concentration part 100 is at a distance W4 from the one end 62 in the opening width direction W (a direction toward the other end 63 is defined as a positive direction) that satisfies a condition that $0.25W3 \leq W4 \leq 0.75W3$.

In the above-described configuration, by providing the stress concentration part 100 in the central area 6C in the opening width direction W at the scroll passage wall surface 6, a long distance can be provided for crack development in the turbine housing 4 (a distance within which a crack occurring in the stress concentration part 100 develops to penetrate through the turbine housing 4). This makes it possible to effectively prevent leakage of exhaust gas to the outside of the turbine housing 4.

As shown in FIG. 6, according to some embodiments, the stress concentration part 100 includes a first side 101 tilting toward one side (toward the left side in the drawing) with respect to a line LC connecting the upstream end 841 and the downstream end 831 at the entrance-side opening edge 81 to each other as the first side 101 extends from the downstream end portion 83 toward an upstream side of a flow direction in the scroll passage 60, and a second side 102 tilting toward the other side (toward the right side in the drawing) with respect to the line LC as the second side 102 extends from the downstream end portion 83 toward the upstream side of the flow direction in the scroll passage 60.

According to the illustrated embodiment, each of the first side 101 and the second side 102 extends in a linear shape. According to the embodiment shown in FIG. 6, in a plan view where the entrance-side opening edge 81 is visually recognized along the normal N2, while an angle formed between a direction in which the first side 101 extends and a direction in which the second side 102 extends is defined as α, each of the first side 101 and the second side 102 is configured in such a manner that the angle α satisfies a condition that $0° \leq \alpha \leq 90°$. According to the embodiment shown in FIG. 6, the stress concentration part 100 further includes a downstream-side connection 105 forming connection between a downstream end 103 of the first side 101 and a downstream end 104 of the second side 102. The downstream-side connection 105 is curved downstream of the scroll passage 60 and includes the downstream end 831. According to some other embodiments, the downstream-side connection 105 may be formed into a linear shape extending in the axis direction X between the downstream end 103 of the first side 101 and the downstream end 104 of the second side 102. According to some other embodiments, the downstream end 103 of the first side 101 may be connected directly to the downstream end 104 of the second side 102. The shape of the entrance-side opening edge 81 upstream from each of an upstream end 106 of the first side 101 and an upstream end 107 of the second side 102 is not limited to the illustrated shape that is a curved shape curved upstream of the scroll passage 60 and connecting the respective upstream ends (106, 107) of the first side 101 and the second side 102 to each other.

In the above-described configuration, the stress concentration part 100 includes the first side 101 and the second side 102. This is to cause concentration of stress resulting from thermal elongation with the heat of exhaust gas flowing in the turbine housing 4 at an initial stage to cause a crack between the downstream end 103 of the first side 101 and the downstream end 104 of the second side 102. This makes it possible to reduce the occurrence of concentration of stress resulting from thermal elongation in the vicinity of the upstream end (106, 107) of the first side 101 or the second side 102. Furthermore, in the above-described configuration, thermal elongation with the heat of exhaust gas is divided into the first side 101 and the second side 102, making it possible to reduce the occurrence of concentration of stress resulting from thermal elongation in the vicinity of the upstream end (106, 107) of the first side 101 or the second side 102.

Compared to a conventional case where the entrance-side opening edge 81 is formed into a circular ring-like shape, an oval ring-like shape, or a rectangular ring-like shape, forming the downstream end portion 83 of the entrance-side opening edge 81 into the shape including the first side 101 and the second side 102 reduces influence on the performance of the turbine housing 4 (for example, the amount of exhaust gas to flow into the wastegate passage 80 and the effect of increasing the temperature of the exhaust gas purification catalyst 18 using exhaust gas having passed through the wastegate passage 80).

As shown in FIG. 7, according to some embodiments, the stress concentration part 100 includes a slit 110 extending from the downstream end portion 83 at the entrance-side opening edge 81 toward a downstream side of a flow direction in the scroll passage 60. According to the illustrated embodiment, the slit 110 is formed at the downstream end 831. According to some other embodiments, however, the slit 110 may be formed at a position in the downstream end portion 83 other than the downstream end 831. The slit 110 is preferably formed at a position in the downstream end portion 83 close to the downstream end 831. According to some other embodiments, the slit 110 may be formed at the downstream end portion 83 of the entrance-side opening edge 81 including the first side 101 and the second side 102 such as that shown in FIG. 6.

In the above-described configuration, the stress concentration part 100 includes the slit 110 extending from the downstream end portion 83 toward the downstream side. This is to cause concentration of stress resulting from thermal elongation with the heat of exhaust gas flowing in the turbine housing 4 at an initial stage to cause a crack in the vicinity of a tip 111 of the slit 110. This makes it possible to reduce the occurrence of concentration of stress resulting from thermal elongation in a part (for example, in the vicinity of the one-side end portion 85 or in the vicinity of the other-side end portion 86) of the entrance-side opening edge 81 other than the downstream end portion 83. The slit 110 can additionally be formed easily in the existing turbine housing 4.

Compared to a case where the slit 110 is not formed at the entrance-side opening edge 81, forming the slit 110 at the entrance-side opening edge 81 reduces influence on the performance of the turbine housing 4 (for example, the amount of exhaust gas to flow into the wastegate passage 80 and the effect of increasing the temperature of the exhaust gas purification catalyst using exhaust gas having passed through the wastegate passage 80).

The present disclosure is not limited to the embodiments described above but it includes embodiments configured by making modifications to the foregoing embodiments and embodiments configured by combining such embodiments as appropriate.

The substances of the embodiments described above may be understood as follows, for example.

1) The turbine housing (4) according to at least one embodiment of the present disclosure is a turbine housing (4) configured to house a turbine wheel (3) to be driven with exhaust gas discharged from a gasoline engine (1), comprising:

a body part (5) including a scroll passage wall surface (6), an exhaust gas discharge path wall surface (7), and a wastegate passage wall surface (8) provided inside the body part (5), the scroll passage wall surface (6) forming a scroll passage (60) having a scroll shape for guiding the exhaust gas to the turbine wheel (3), the exhaust gas discharge path wall surface (7) forming an exhaust gas discharge path (70) for discharging the exhaust gas having passed through the turbine wheel (3), the wastegate passage wall surface (8) forming a wastegate passage (80) connecting the scroll passage (60) and the exhaust gas discharge path (70) to each other while bypassing the turbine wheel (3); and an entrance flange part (9) provided at an upstream end (61) of the scroll passage (60) in the body part (5), the entrance flange part (9) including an exhaust gas inlet (41) leading to the scroll passage (60), wherein the wastegate passage (80) has an entrance-side opening edge (81) formed at the scroll passage wall surface (6) and provided at a position where the entrance-side opening edge (81) is visually recognizable at least partially from outside the turbine housing (4) through the exhaust gas inlet (41).

In the above-described configuration 1), in the turbine housing, the entrance-side opening edge of the wastegate passage is provided at a position where the entrance-side opening edge is visually recognizable at least partially from outside the turbine housing through the exhaust gas inlet. In this case, the scroll passage (upstream-side scroll passage 60A) defined between an entrance opening of the wastegate passage and the exhaust gas inlet of the entrance flange part has a short length. Forming the upstream-side scroll passage into a short length achieves reduction in heat dissipation loss of exhaust gas in the upstream-side scroll passage to pass through the wastegate passage, namely, exhaust gas to flow from the exhaust gas inlet into the wastegate passage through the upstream-side scroll passage. This makes it possible to suppress temperature drop of the exhaust gas to pass through the wastegate passage and flow downstream from the turbine housing. As a result, the temperature of an exhaust gas purification catalyst arranged downstream from the turbine housing can be increased effectively.

2) According to some embodiments, in the turbine housing (4) described above in 1), the entrance-side opening edge (81) includes a stress concentration part (100) provided at a downstream end portion (83) including a downstream end (831) at the entrance-side opening edge (81) and configured to cause concentration of stress resulting from thermal elongation.

In the above-described configuration 2), the entrance-side opening edge includes the stress concentration part provided at the downstream end portion of the entrance-side opening edge and configured to cause concentration of stress resulting from thermal elongation. The stress concentration part is to cause concentration of stress resulting from thermal elongation with the heat of exhaust gas flowing in the turbine housing at an initial stage to cause a crack. Providing the stress concentration part at the downstream end portion of the entrance-side opening edge makes it possible to reduce the occurrence of concentration of stress resulting from thermal elongation and the occurrence of a crack in a part of the entrance-side opening edge other than the downstream end portion. The downstream end portion of the entrance-side opening edge has a larger thickness to an outer surface of the turbine housing than portions except the downstream end portion, making it possible to prevent leakage of exhaust gas to the outside of the turbine housing to be caused by development of the above-described crack and penetration thereof through the turbine housing.

3) According to some embodiments, in the turbine housing (4) described above in 2), the stress concentration part (100) includes:

a first side (101) tilting toward one side with respect to a first line (line LC) connecting an upstream end (841) and the downstream end (831) at the entrance-side opening edge (81) to each other as the first side (101) extends from the downstream end portion (83) toward an upstream side of a flow direction in the scroll passage (60); and a second side (102) tilting toward the other side with respect to the first line (line LC) as the second side (102) extends from the downstream end portion (83) toward the upstream side of the flow direction in the scroll passage (60).

In the above-described configuration 3), the stress concentration part includes the first side and the second side. This is to cause concentration of stress resulting from thermal elongation with the heat of exhaust gas flowing in the turbine housing at an initial stage to cause a crack between a downstream end of the first side and a downstream end of the second side. This makes it possible to reduce the occurrence of concentration of stress resulting from thermal elongation in the vicinity of an upstream end of the first side or the second side. Furthermore, in the above-described configuration, thermal elongation with the heat of exhaust gas is divided into the first side and the second side, making it possible to reduce the occurrence of concentration of stress resulting from thermal elongation in the vicinity of the upstream end of the first side or the second side.

4) According to some embodiments, in the turbine housing (4) described above in 2), the stress concentration part (100) includes a slit (110) extending from the downstream end portion (83) at the entrance-side opening edge (81) toward a downstream side of a flow direction in the scroll passage (60).

In the above-described configuration 4), the stress concentration part includes the slit extending from the downstream end portion toward the downstream side. This is to cause concentration of stress resulting from thermal elongation with the heat of exhaust gas flowing in the turbine housing at an initial stage to cause a crack in the vicinity of a tip of the slit. This makes it possible to reduce the occurrence of concentration of stress resulting from thermal elongation in a part of the entrance-side opening edge other than the downstream end portion. The slit can additionally be formed easily in the existing turbine housing.

5) According to some embodiments, in the turbine housing (4) described above in any one of 2) to 4), the stress concentration part (100) is provided in a central area (6C) in an opening width direction (W) of an entrance opening (810) of the wastegate passage (80) at the scroll passage wall surface (6).

In the above-described configuration 5), by providing the stress concentration part in the central area in the opening width direction at the scroll passage wall surface, a long distance can be provided for crack development in the turbine housing (a distance within which a crack occurring in the stress concentration part develops to penetrate through the turbine housing). This makes it possible to prevent leakage of exhaust gas to the outside of the turbine housing effectively.

6) According to some embodiments, in the turbine housing (4) described above in any one of 2) to 5), the exhaust gas discharge path (70) is configured to guide the exhaust gas from one side toward the other side of a direction in which an axis (LA) of the turbine wheel (3) extends, and a normal (N1) passing through the center (C1) of an exit opening (820) of the wastegate passage (80) is configured to extend in a direction intersecting the axis (LA) of the turbine wheel (3).

In the above-described configuration 6), the wastegate passage has the exit opening leading to the exhaust gas discharge path and has the entrance opening leading to the scroll passage provided on an outer peripheral side of the exhaust gas discharge path. The wastegate passage is configured in such a manner that the normal passing through the center of the exit opening extends in a direction intersecting the axis of the turbine wheel. In this case, the length of the wastegate passage (a distance from the entrance opening to the exit opening) can be shortened, compared to a case where the normal extends in a direction in which the axis of the turbine wheel extends. Shortening the length of the wastegate passage makes it possible to reduce heat dissipation loss of exhaust gas in the wastegate passage to pass in the wastegate passage. By doing so, it becomes possible to suppress temperature drop of the exhaust gas to pass through the wastegate passage and flow downstream from the turbine housing. As a result, the temperature of the exhaust gas purification catalyst arranged downstream from the turbine housing can be increased effectively.

7) According to some embodiments, in the turbine housing (4) described above in 6), in a plan view covering the axis (LA) of the turbine wheel (3) and the center (C1) of the exit opening (820), $30° \leq \theta \leq 60°$ is satisfied where $\theta$ is an angle formed between the axis (LA) and the normal (N1).

In the above-described configuration 7), the length of the wastegate passage can be shortened if the angle $\theta$ satisfies $30° \leq \theta \leq 60°$. If the angle $\theta$ satisfies $30° \leq \theta \leq 60°$, exhaust gas having flowed into the exhaust gas discharge path from the exit opening of the wastegate passage can be guided to the exhaust gas outlet along the exhaust gas discharge path wall surface and can be discharged to the outside of the turbine housing from the exhaust gas outlet. This allows the exhaust gas having passed through the wastegate passage to flow favorably in the exhaust gas discharge path, so that heat dissipation loss of the exhaust gas to pass through the wastegate passage can be reduced in the exhaust gas discharge path. This makes it possible to suppress temperature drop of the exhaust gas to pass through the wastegate passage and flow downstream from the turbine housing. As a result, the temperature of the exhaust gas purification catalyst arranged downstream from the turbine housing can be increased effectively.

A turbocharger (2) according to at least one embodiment of the present disclosure comprises the turbine housing (4) described above in any one of 1) to 7).

In the above-described configuration 8), by defining a short distance along the upstream-side scroll passage in the turbine housing in the turbocharger, heat dissipation loss of exhaust gas to pass through the wastegate passage can be reduced in the upstream-side scroll passage. This eventually makes it possible to effectively increase the temperature of the exhaust gas purification catalyst arranged downstream from the turbine housing.

A gasoline engine (1) according to at least one embodiment of the present disclosure comprises:

a cylinder block (11) including a plurality of cylinders (12);

an exhaust manifold (13) where exhaust gases discharged from respective ones of the plurality of cylinders (12) join together, the exhaust manifold (13) being provided at least partially inside the cylinder block (11); and the turbocharger (2) described above in 8), wherein the entrance flange part (9) of the turbine housing (4) is connected to the exhaust manifold (13).

In the above-described configuration 9), exhaust gases discharged from respective ones of the plurality of cylinders pass through the exhaust manifold and then flow into the scroll passage from the exhaust gas inlet of the entrance flange part. The exhaust manifold is provided at least partially inside the cylinder block with the plurality of cylinders, and the entrance flange part is connected to the exhaust manifold. In this case, heat dissipation loss of the exhaust gases discharged from respective ones of the plurality of cylinders can be reduced in the exhaust manifold. Temperature drop of exhaust gas to pass through the wastegate passage and flow downstream from the turbine housing is suppressed on an upstream side, making it possible to effectively increase the temperature of the exhaust gas purification catalyst arranged downstream from the turbine housing.

REFERENCE SIGNS LIST

1 Gasoline engine
2 Turbocharger
3 Turbine wheel
4 Turbine housing
5 Body part
6 Scroll passage wall surface
6A Scroll outer wall surface
6B Scroll inner wall surface
7 Exhaust gas discharge path wall surface
8 Wastegate passage wall surface
9 Entrance flange part
11 Cylinder block
12 Cylinder
13 Exhaust manifold
14 Compressed gas supply line
15 Cooler
16 Water jacket
17 Coolant supply line
18 Exhaust gas purification catalyst
21 Compressor wheel
22 Rotational shaft
23 Compressor housing
24 Bearing
25 Bearing housing
26 Wastegate valve
41 Exhaust gas inlet
42 Exhaust gas outlet
43 Convex curved surface
44 Shroud surface
60, 60A Scroll passage
70 Exhaust gas discharge path
70A Valve housing space
71 Tilting surface
73 Valve housing surface 80 Wastegate passage
81 Entrance-side opening edge
82 Exit-side opening edge
83 Downstream end portion
84 Upstream end portion
85 One-side end portion
86 Other-side end portion
91 Rim
100 Stress concentration part
101 First side
102 Second side
105 Downstream-side connection
110 Slit
171 Cooling water storage tank
172 Cooling water supply pipe
173 Cooling water pump
231 Gas inlet
232 Gas outlet
261 Valve body
262 Valve body driver
810 Entrance opening
820 Exit opening
C1, C2 Center
LA Axis
LC Line
N1, N2 Normal
P1 Contact point
TL Tangent
X Axis direction
XF Turbine side
XR Compressor side
Y Radial direction

The invention claimed is:

1. A turbine housing configured to house a turbine wheel to be driven with exhaust gas discharged from a gasoline engine, comprising:
   a body part including a scroll passage wall surface, an exhaust gas discharge path wall surface, and a wastegate passage wall surface provided inside the body part,
   the scroll passage wall surface forming a scroll passage having a scroll shape for guiding the exhaust gas to the turbine wheel,
   the exhaust gas discharge path wall surface forming an exhaust gas discharge path for discharging the exhaust gas having passed through the turbine wheel,
   the wastegate passage wall surface forming a wastegate passage connecting the scroll passage and the exhaust gas discharge path to each other while bypassing the turbine wheel; and
   an entrance flange part provided at an upstream end of the scroll passage in the body part, the entrance flange part including an exhaust gas inlet leading to the scroll passage, wherein
   the wastegate passage has an entrance-side opening edge formed at the scroll passage wall surface and provided at a position where the entrance-side opening edge is visually recognizable at least partially from outside the turbine housing through the exhaust gas inlet,
   wherein the entrance-side opening edge includes a stress concentration part provided at a downstream end portion including a downstream end at the entrance-side opening edge and configured to cause concentration of stress resulting from thermal elongation.

2. The turbine housing according to claim 1, wherein the stress concentration part includes:
   a first side tilting toward one side with respect to a first line connecting an upstream end and the downstream end at the entrance-side opening edge to each other as the first side extends from the downstream end portion toward an upstream side of a flow direction in the scroll passage; and
   a second side tilting toward the other side with respect to the first line as the second side extends from the downstream end portion toward the upstream side of the flow direction in the scroll passage.

3. The turbine housing according to claim 1, wherein the stress concentration part includes a slit extending from the downstream end portion at the entrance-side opening edge toward a downstream side of a flow direction in the scroll passage.

4. The turbine housing according to claim 1, wherein the stress concentration part is provided in a central area in an opening width direction of an entrance opening of the wastegate passage at the scroll passage wall surface.

5. The turbine housing according to claim 1, wherein the exhaust gas discharge path is configured to guide the exhaust gas from one side toward the other side of a direction in which an axis of the turbine wheel extends, and
   a normal passing through the center of an exit opening of the wastegate passage is configured to extend in a direction intersecting the axis of the turbine wheel.

6. The turbine housing according to claim 5, wherein in a plan view covering the axis of the turbine wheel and the center of the exit opening, 30°≤θ≤60° is satisfied where θ is an angle formed between the axis and the normal.

7. A turbocharger comprising the turbine housing according to claim 1.

8. A gasoline engine comprising:
   a cylinder block including a plurality of cylinders;
   an exhaust manifold where exhaust gases discharged from respective ones of the plurality of cylinders join together, the exhaust manifold being provided at least partially inside the cylinder block; and
   the turbocharger according to claim 7, wherein the entrance flange part of the turbine housing is connected to the exhaust manifold.

* * * * *